(12) United States Patent
Hsu et al.

(10) Patent No.: US 7,773,259 B2
(45) Date of Patent: Aug. 10, 2010

(54) HUE ADJUSTING DEVICE (75) Inventors: Kai-Hsiang Hsu, Tucheng (TW);
Yi-Chia Shan, Jhongli (TW);
Tsan-Hung Tsai, Sanchong (TW);
Hsu-Chia Kao, Pingjhen (TW)

(73) Assignee: Marketech International Corp., Taipei (TW)

( * ) Notice: Subject to any disclaimer, the term of this patent is extended or adjusted under 35 U.S.C. 154(b) by 730 days.

(21) Appl. No.: 11/797,853

(22) Filed: May 8, 2007

(65) Prior Publication Data
US 2008/0013135 A1 Jan. 17, 2008

(30) Foreign Application Priority Data
Jul. 17, 2006 (TW) .............................. 95125983 A (51) Int. Cl.
*H04N 1/60* (2006.01)
*H04N 9/64* (2006.01)
*G03F 3/08* (2006.01)
*G06K 9/00* (2006.01)
*G06F 3/00* (2006.01)
*G09G 5/02* (2006.01)

(52) U.S. Cl. ................. 358/1.9; 358/518; 358/520; 358/523; 382/162; 382/167; 382/282; 348/649; 348/654; 715/719; 345/589; 345/591; 345/593; 345/657

(58) Field of Classification Search ................. 358/1.9, 358/518, 520, 523; 382/162, 167, 282; 348/649, 348/654; 715/719; 345/589, 591, 593, 604, 345/657
See application file for complete search history.

(56) References Cited

U.S. PATENT DOCUMENTS

| | | | |
|---|---|---|---|
| 5,724,442 A * | 3/1998 | Ogatsu et al. | 382/167 |
| 5,841,896 A * | 11/1998 | Tsuchiya | 382/162 |
| 7,327,404 B2 * | 2/2008 | Chen et al. | 348/654 |
| 2004/0169873 A1 * | 9/2004 | Nagarajan | 358/1.9 |

* cited by examiner

*Primary Examiner*—Charlotte M Baker
(74) *Attorney, Agent, or Firm*—Bacon & Thomas, PLLC (57) ABSTRACT

The invention provides a hue adjusting device. When one color axis including different hues is being adjusted by the user, the hue adjusting device will rotate each of the different hue angles in different rotation angles. Accordingly, the color of an image adjusted by the invention will be smoother than the prior art. Namely, the image quality can be improved.

6 Claims, 7 Drawing Sheets

| d\U H | 0 | 1 | 2 | ... | 14 | 15 |
|---|---|---|---|---|---|---|
| 0 | $d_{00}$ | $d_{10}$ | $d_{20}$ | ... | $d_{140}$ | $d_{150}$ |
| 1 | $d_{01}$ | $d_{11}$ | $d_{21}$ | ... | $d_{141}$ | $d_{151}$ |
| 2 | $d_{02}$ | $d_{12}$ | $d_{22}$ | ... | $d_{142}$ | $d_{152}$ |
| : | : | : | : | ... | : | : |
| 21 | $d_{021}$ | $d_{121}$ | $d_{221}$ | ... | $d_{1421}$ | $d_{1521}$ |
| 22 | $d_{022}$ | $d_{122}$ | $d_{222}$ | ... | $d_{1422}$ | $d_{1522}$ |
| : | : | : | : | ... | : | : |
| 43 | $d_{043}$ | $d_{143}$ | $d_{243}$ | ... | $d_{1443}$ | $d_{1543}$ |
| : | : | : | : | ... | : | : |
| 358 | $d_{0358}$ | $d_{1358}$ | $d_{2358}$ | ... | $d_{14358}$ | $d_{15358}$ |
| 359 | $d_{0359}$ | $d_{1359}$ | $d_{2359}$ | ... | $d_{14359}$ | $d_{15359}$ |

Rows 0–21: First color axis
Rows 22–43: Second color axis

HUE ADJUSTING DEVICE

BACKGROUND OF THE INVENTION

1. Field of the Invention

The invention relates to a hue adjusting device and, more particularly, to a hue adjusting device which can adjust different hues within the color axis by different rotation angles.

2. Description of the Prior Art

When looking at an image, users often adjust some colors of the image based on their preference. For example, a user may try to make the sky bluer or the grasslands greener in an image. In general, the adjustable parameters in the image comprise lightness, hue, and saturation. However, for most of the applications, it is more suitable to use the hue to divide colors.

Figure 1:
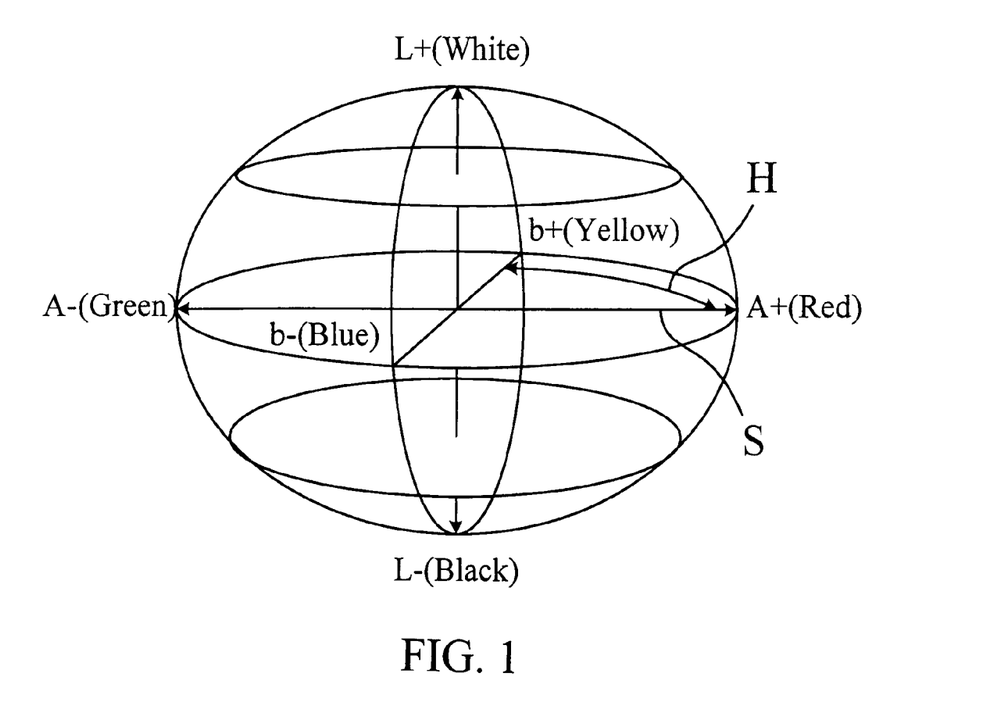
FIG. 1 is a schematic diagram of the Lab color space.

In order to deal with the color of an image, the signal of the image must be converted from the original color space (e.g. RGB) to the color space (e.g. YCbCr, YUV, CIELab, etc.) where the lightness (Y) and the colors (C) are separated. Then, the information about the lightness, the hue, and the saturation of the image can be obtained. Referring to FIG. 1, FIG. 1 is a schematic diagram of Lab color space. Taking Lab color space for example, L represents lightness component; a and b represent color components. As shown in FIG. 1, the lightness (L) is controlled by the height, the hue (H) is controlled by the angle, and the saturation (S) is controlled by the radius.

Figure 2:
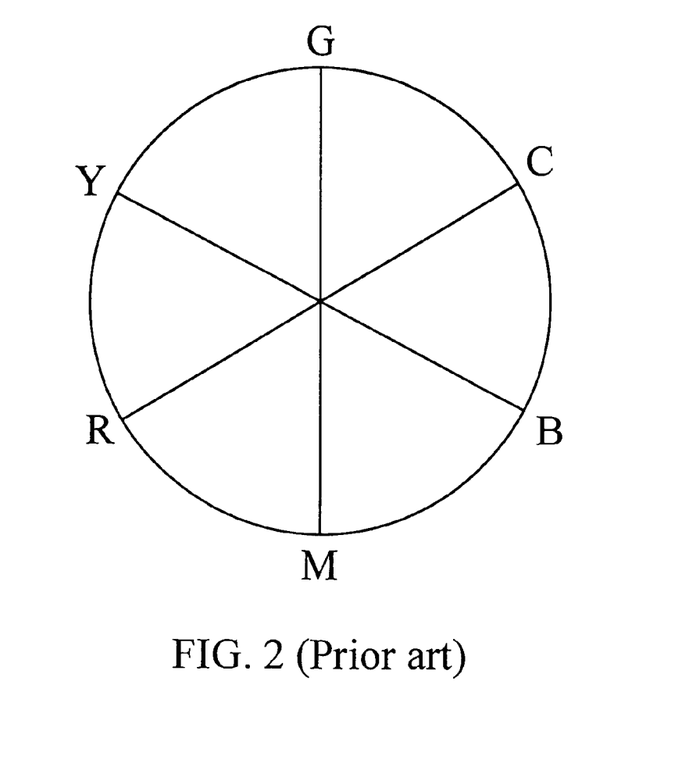
FIG. 2 is a schematic diagram of the hue being divided into six color axes according to the prior art.

The distribution of the hue ranges from 0° to 360° in the Y/C separated color space. The distribution of the hue can be divided into several color axes with different range of angles based on the practical requirement. Referring to FIG. 2, FIG. 2 is a schematic diagram of dividing the hue into six color axes in the prior art. In the prior art, the conventional integrated circuit (IC) used to adjust colors often divides colors into six color axes according to the hues. As shown in FIG. 2, these color axes are red (R), blue (B), green (G), cyan (C), magenta (M), and yellow (Y) respectively. Furthermore, the color of skin may be added to those color axes by some ICs. It is convenient for the user to adjust when there are seven color axes.

Figure 3:
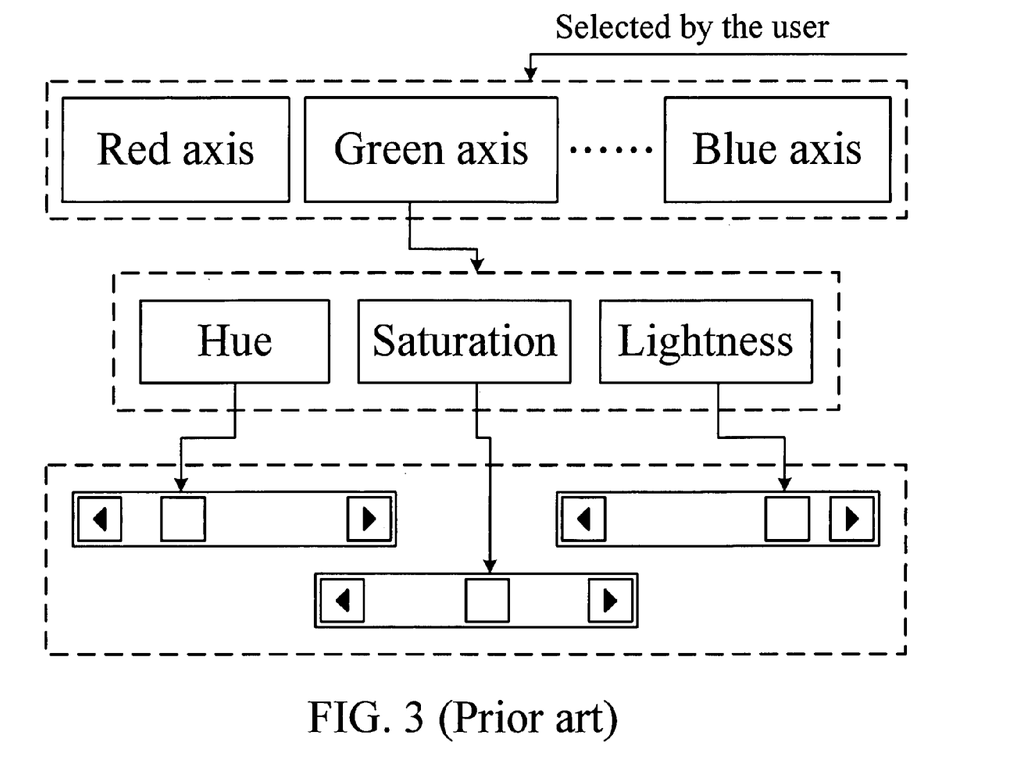
FIG. 3 is a schematic diagram of selecting the color axis and adjusting the image state.

Referring to FIG. 3, FIG. 3 is a schematic diagram of selecting color axis and adjusting the state of image. As shown in FIG. 3, a user can use on screen display (OSD) to select the axis which is desired to be adjusted first, and then he/she can select the state of image which is desired to be adjusted (e.g. lightness, hue, or saturation).

In general, the hue of certain pixel in an image signal can be adjusted by changing its hue angle. When adjusting the hue of certain color axis in an image, all hues in the color axis are rotated to the same angle based on the prior art. As a result, it causes difference and uneven lines. In other words, even though all colors are in the same axis, the rotation angles of hue are supposed to be different.

Therefore, the main scope of the invention is to provide a hue adjusting device to solve the above mentioned problems.

SUMMARY OF THE INVENTION

A scope of the invention is to provide a hue adjusting device using a look-up table to record the corresponding rotation angles of different hues in each of the color axes, and by doing so, different hues in the same color axis can be adjusted by different rotation angles.

According to a preferred embodiment of the invention, an image signal is inputted to a display system, and the image signal is composed of N pixels, wherein N is a natural number. And, each of the pixels of the image signal is converted to the one which comprises a first color component and a second color component. Therefore, the hue adjusting device of the present invention is used to adjust a hue angle of the i-th pixel of the image signal, wherein i is an integer index ranging from 1 to N. And, the hue angle is obtained by converting the first color component and the second color component.

In the above embodiment, the hue adjusting device comprises a first memory unit, a second memory unit, a first processing unit, and a second processing unit. The first memory unit stores a first look-up table, and the second memory unit stores a second look-up table. The first look-up table records a plurality of hue angles, a plurality of adjusting parameters, and a plurality of rotation angles. Each of the rotation angles is corresponding to one of the hue angles and one of the adjusting parameters respectively. And, these hue angles are divided into a plurality of color axes.

According to a user-selected color axis and a user-selected adjusting parameter, the first processing unit will download a plurality of corresponding rotation angles from the first look-up table to the second look-up table wherein the user-selected color axis is the one selected from the above divided color axes and the user-selected adjusting parameter is the one selected from the adjusting parameters of the first look-up table.

Then, the second processing unit will retrieve a rotation angle from the second look-up table according to the hue angle of the i-th pixel. And the first color component and the second color component of the i-th pixel will be readjusted based on the retrieved rotation angle. In this way, the hue angle of the i-th pixel can be readjusted.

Therefore, in the hue adjusting device according to the invention, when one color axis including different hues is adjusted by a user, the hue adjusting device will rotate each of the different hue angles in different rotation angles. Accordingly, after the adjustment, the image will be smoother than the prior art; namely, it has no difference and uneven lines. Consequently, the quality of the adjusted image will also be improved.

The advantage and spirit of the invention may be understood by the following recitations together with the appended drawings.

DETAILED DESCRIPTION OF THE INVENTION

Referring to FIG. 4, FIG. 4 is a functional block diagram of a display system 1 according to a preferred embodiment of the invention. As shown in FIG. 4, the display system 1 comprises color space converting devices 10a, 10b, a color area dividing device 12, a lightness adjusting device 14, a hue adjusting device 16, and a saturation adjusting device 18.

The invention can be applied to all color spaces having lightness separated from colors, such as YCbCr, YUV, CIELab, etc. In this embodiment, the color space converting device 10a of the display system 1 will convert the image signal from the original color space (e.g. RGB) to the color space (e.g. CIELab) having lightness separated from colors. Then, the information about the lightness, the hue, and the saturation of the image can be obtained. The distribution of the hue ranges from 0° to 360°. In other words, when an image signal composed of N pixels is inputted to the display system 1, each of the pixels of the image signal is converted to comprise a lightness component Y, a first color component C1, and a second color component C2, wherein N is a natural number. This can be easily achieved by the one skilled in the art, so the details are not further described.

The hue dividing device 12 is used to divide the hue angles of the color space into a plurality of color axes in the display system 1. The hue dividing device 12 stores a fourth look-up table 120, and the fourth look-up table 120 records a plurality of boundaries to divide the hue angles into a plurality of color axes. In this embodiment, the fourth look-up table 120 can record 17 boundaries which are set as 0, 22, 44, 66, 88, 110, 132, 154, 176, 198, 220, 242, 264, 286, 308, 330, 360 to further divide the hue angles into 16 axes. That is to say, the first color axis comprises hue angles ranging from 0° to 21°; the second color axis comprises hue angles ranging from 22° to 43°, and so forth.

The hue adjusting device 16 of the invention is used to adjust a hue angle of the i-th pixel of the image signal in the display system 1, wherein i is an integer index ranging from 1 to N. The hue angle is obtained by converting the first color component C1 and the second color component C2. It should be noticed that the conversion of the hue angles can also be easily achieved by the one skilled in the art, so the details are not further described.

Figure 4A:
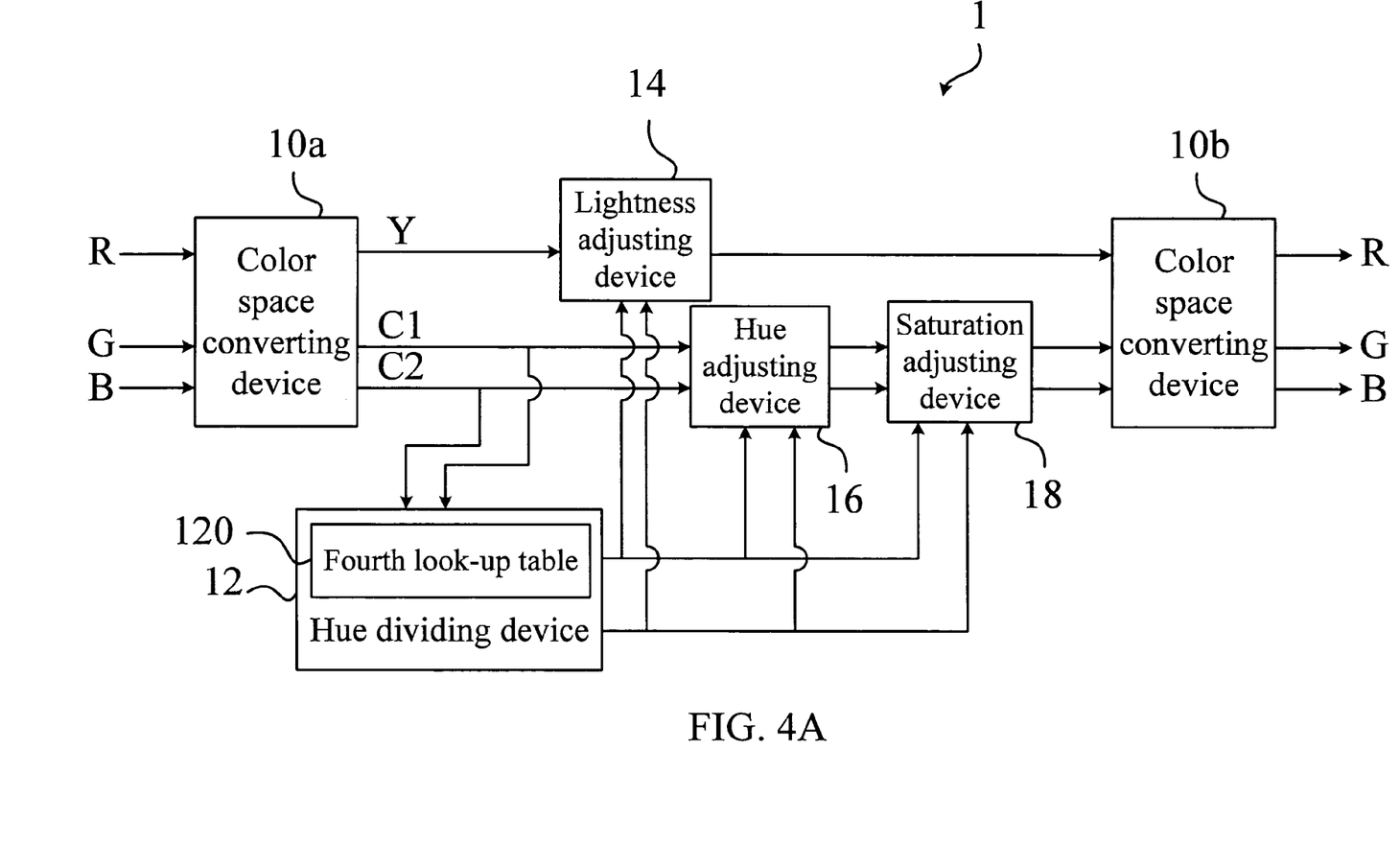
FIG. 4A is a functional block diagram of a display system according to a preferred embodiment of the invention.
Figure 4B:
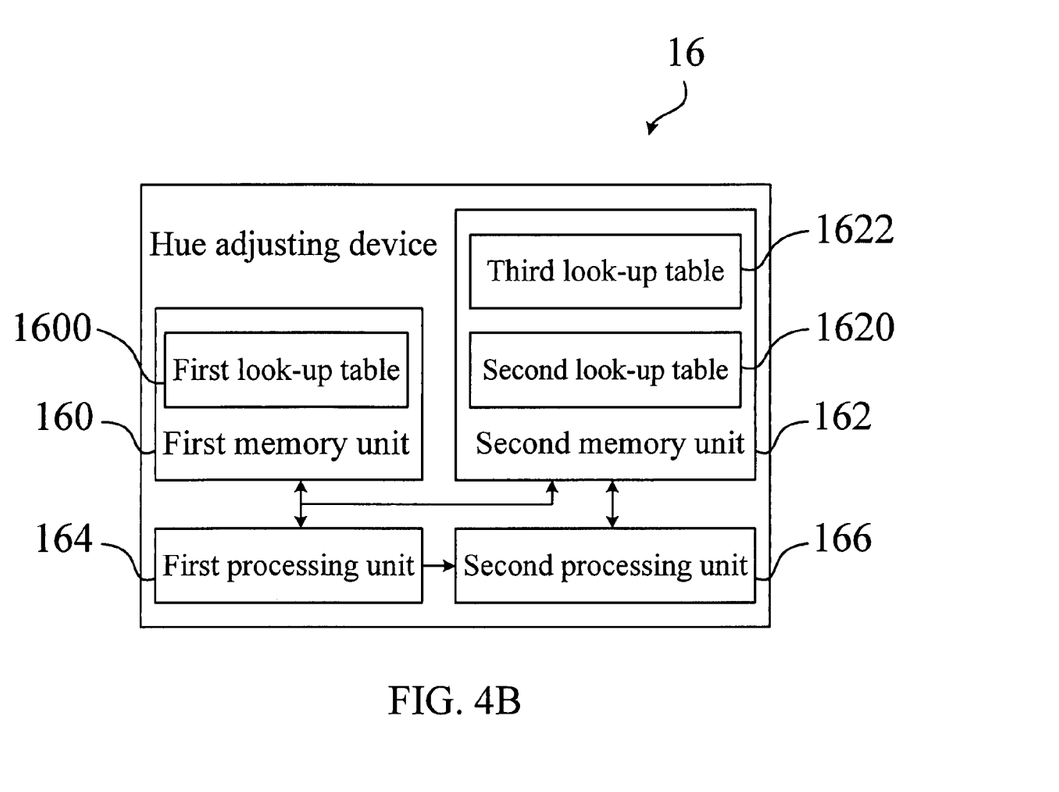
FIG. 4B is a functional block diagram of the hue adjusting device shown in FIG. 4A.

Referring to FIG. 4B, FIG. 4B is a functional block diagram of the hue adjusting device 16 shown in FIG. 4A. As shown in FIG. 4B, the hue adjusting device 16 comprises a first memory unit 160, a second memory unit 162, a first processing unit 164, and a second processing unit 166. The first memory unit 160 stores a first look-up table 1600, and the second memory unit 162 stores a second look-up table 1620 and a third look-up table 1622. The first memory unit 160 can be a flash memory or any other non-volatile storing devices. The second memory unit 162 is a random access memory (RAM) of an IC.

Figure 5:
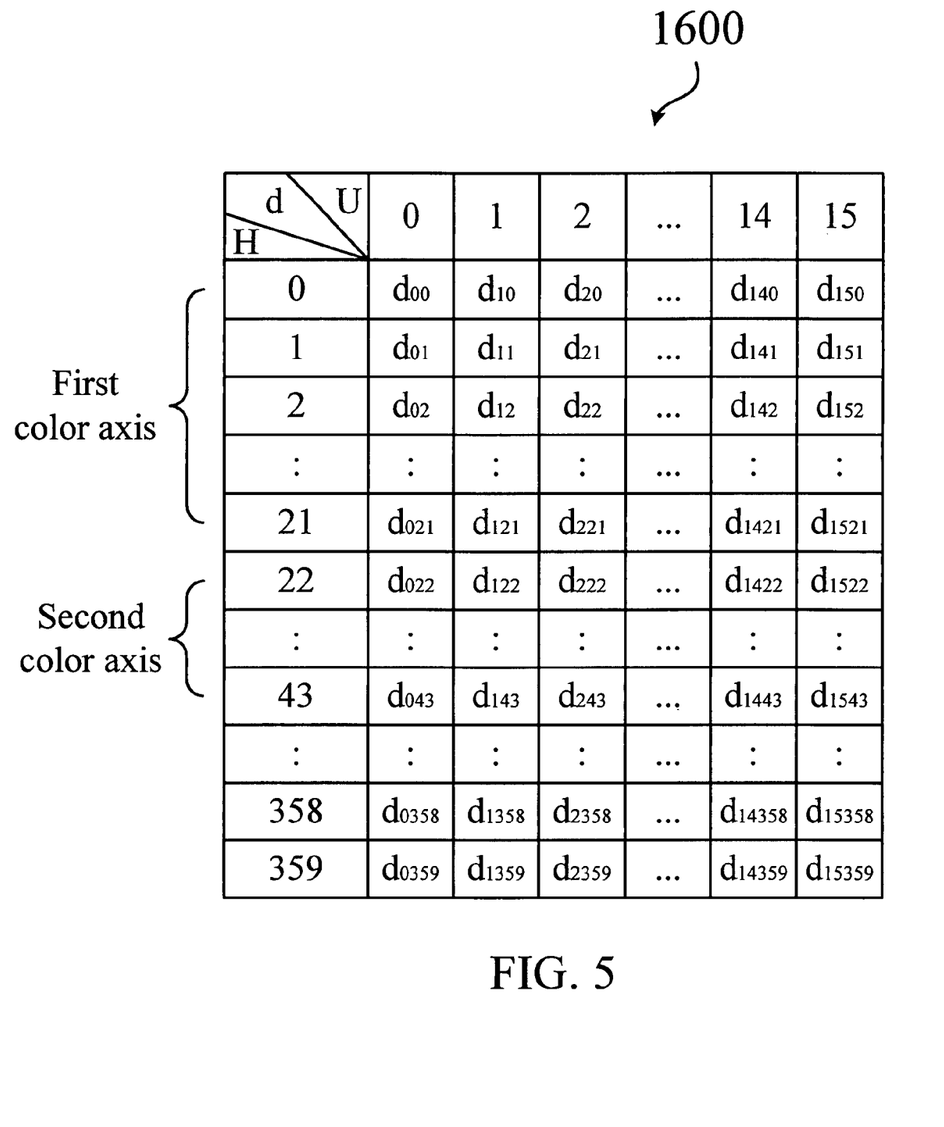
FIG. 5 is a schematic diagram of the first look-up table shown in FIG. 4A.

Referring to FIG. 5, FIG. 5 is a schematic diagram of the first look-up table 1600 shown in FIG. 4A. The first look-up table 1600 records a plurality of hue angles, a plurality of adjusting parameters, and a plurality of rotation angles. Each of the rotation angles is corresponding to one of the hue angles and one of the adjusting parameters respectively. In this embodiment, the first look-up table 1600 can record 360 hue angles (H), 16 adjusting parameters (U), and 360*16 rotation angles (d), as shown in FIG. 5.

Figure 6:
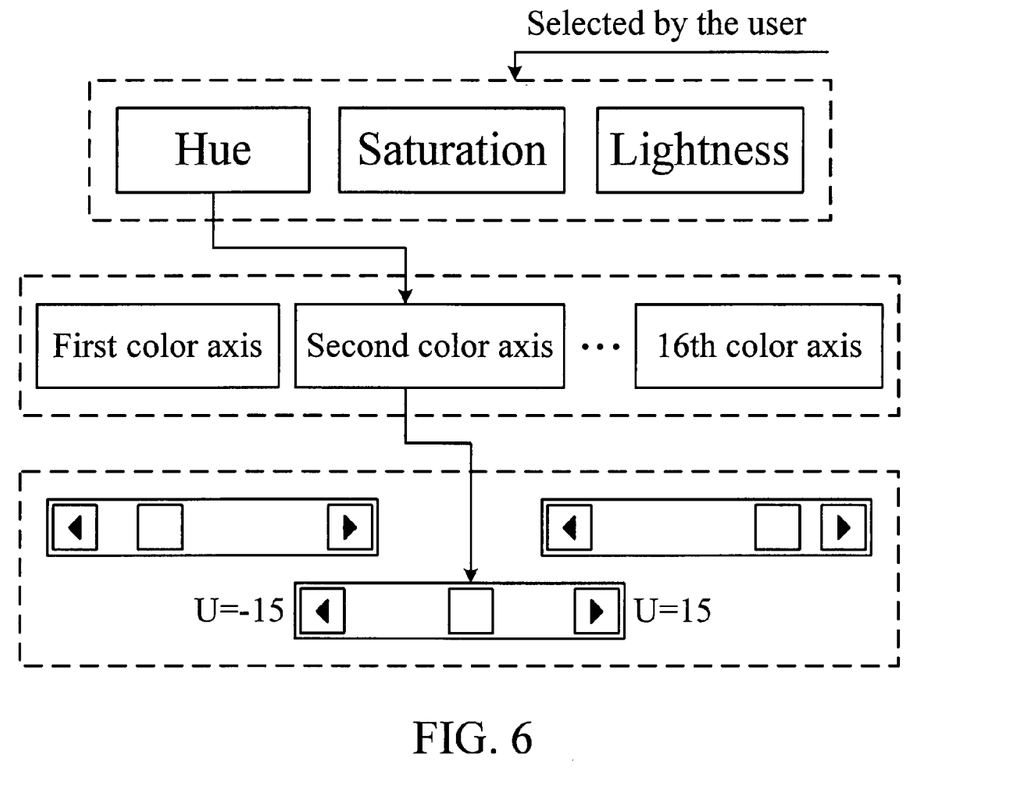
FIG. 6 is a schematic diagram of selecting the color axis and adjusting the image state.

Referring to FIG. 6, FIG. 6 is a schematic diagram of selecting the color axis and adjusting the image state. The user can make an adjustment by selecting hue with the on screen display (OSD) shown in FIG. 6. As shown in FIG. 6, the adjusting parameter U can be set as −15~15, wherein the negative value represents "rotating the hue angle clockwise" and the positive value represents "rotating the hue angle counterclockwise". It should be noticed that the positive value and negative value of the adjusting parameter can be controlled by the following mentioned functions of sine and cosine. Thus, the first look-up table only needs to record 16 adjusting parameters.

Figure 7:
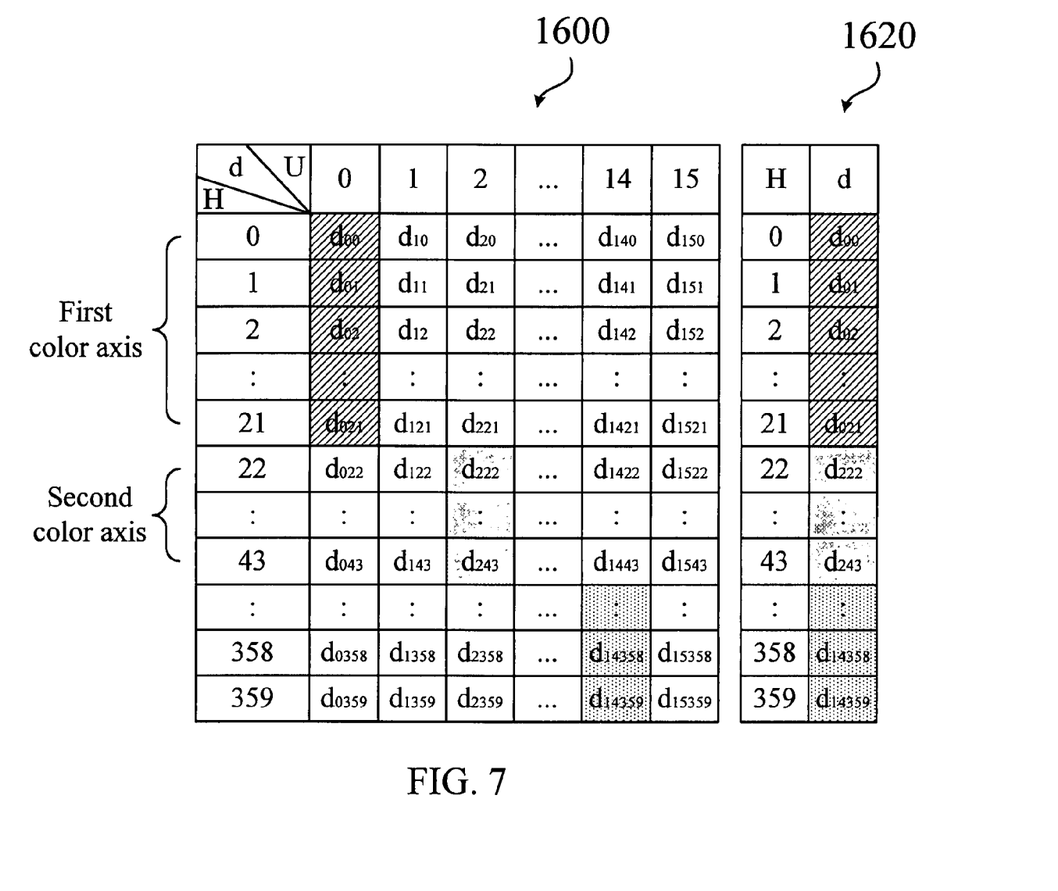
FIG. 7 is a diagram of the relation between the first look-up table and the second look-up table.

Referring to FIG. 7, FIG. 7 is a diagram of the relation between the first look-up table 1600 and the second look-up table 1620. In this embodiment, when the user wants to adjust the hue of the second color axis and selects the adjusting parameter 2, the first processing unit 164 will download 22 corresponding rotation angles ($d_{222}$~$d_{243}$) from the first look-up table 1600 to the second look-up table 1620 according to the user-selected color axis (the second color axis) and the user-selected adjusting parameter (U=2 or U=−2), as shown in FIG. 7. Likewise, when the user wants to adjust the hue of the first color axis and selects the adjusting parameter 0, the first processing unit 164 will also download 22 corresponding rotation angles ($d_{000}$~$d_{021}$) from the first look-up table 1600 to the second look-up table 1620 according to the user-selected color axis (the first color axis) and the user-selected adjusting parameter (U=0).

Afterward, the second processing unit 166 will retrieve a rotation angle from the second look-up table 1620 and readjust the first color component C1 and the second color component C2 of the i-th pixel according to the retrieved rotation angle and the third look-up table 1622 with the following formulas. The third look-up table 1622 records a plurality of the sine values and cosine values corresponding to the rotation angles.

$$C1_{adj} = C1 \cdot \cos(d) - C2 \cdot \sin(d);$$

$$C2_{adj} = C1 \cdot \sin(d) + C2 \cdot \cos(d). \quad \text{Formula 1}$$

In Formula 1, d represents the retrieved rotation angle, $C1_{adj}$ represents the readjusted first color component, and $C2_{adj}$ represents the readjusted second color component. The sine value and cosine value are selected from the third look-up table 1622. After administering Formula 1, the adjustment of the hue angle of the i-th pixel is done. In other words, each of the pixels in an image signal can be rotated in different angles by the hue adjusting device 16 of the invention. Accordingly, the adjustment of the hue can be further finished. If the adjusting parameter selected by the user is less than 0, the Formula 1 could be modified to the following Formula 2:

$$C1_{adj} = C1 \cdot \cos(d) + C2 \cdot \sin(d);$$

$$C2_{adj} = -C1 \cdot \sin(d) + C2 \cdot \cos(d). \quad \text{Formula 2}$$

Referring to FIG. 4A again, the lightness and the saturation of the image signal can be further adjusted by the lightness adjusting device 14 and saturation adjusting device 18 respectively. At last, the input image will be converted to the original color space (e.g., converted from the Lab color space to the RGB color space). The related techniques can be easily achieved by the one skilled in the art, so the details are not further described.

Compared to the prior art, when the user desires to adjust the hues of certain color axis with the hue adjusting device based on the invention, each of the different hue angles will be rotated in different rotation angles. By doing so, the image will be smoother than the prior art; namely, it is without difference and uneven lines after the adjustment. Consequently, the quality of the adjusted image can also be improved. Besides, the first look-up table can be expanded according to the practical applications and the memory in the circuit (the second memory unit) can process more steps of hue adjustment without expanding its capacity. And, since the first look-up table and the second look-up table only store the rotation angles of each hue and the third look-up table saves the values of sine and cosine, a lot of memories can be saved by one more time of checking table.

With the above example and explanation, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A hue adjusting device, an image signal being inputted to a display system, the image signal being composed of N pixels, N being a natural number, each of the N pixels of the image signal being converted to the one comprising a first color component and a second color component, the hue adjusting device being used to adjust a hue angle of the i-th pixel of the image signal, i being an integer index ranging from 1 to N, the hue angle being obtained by converting the first color component and the second color component, and the hue adjusting device comprising:

a first memory unit for storing a first look-up table, the first look-up table recording a plurality of hue angles, a plurality of adjusting parameters, and a plurality of rotation angles, each of the rotation angles being corresponding to one of the hue angles and one of the adjusting parameters respectively, and the plurality of hue angles also being divided into a plurality of color axes;

a second memory unit for storing a second look-up table;

a first processing unit for downloading a plurality of corresponding rotation angles from the first look-up table to the second look-up table according to a user-selected color axis and a user-selected adjusting parameter, wherein the user-selected color axis is the one selected from the color axes, and the user-selected adjusting parameter is the one selected from the adjusting parameters of the first look-up table; and a second processing unit for retrieving a rotation angle from the second look-up table according to the hue angle of the i-th pixel and for readjusting the first color component and the second color component of the i-th pixel, such that the hue angle of the i-th pixel is readjusted.

2. The hue adjusting device of claim 1, wherein the second memory unit stores a third look-up table, the third look-up table records a plurality of sine values and cosine values corresponding to the rotation angles.

3. The hue adjusting device of claim 2, wherein the second processing unit readjusts the first color component and the second color component of the i-th pixel according to the following formulas:

$$C1_{adj}=C1\cdot\cos(d)-C2\cdot\sin(d)$$

$$C2_{adj}=C1\cdot\sin(d)+C2\cdot\cos(d)$$

wherein C1 represents the first color component, C2 represents the second color component, d represents the retrieved rotation angle, $C1_{adj}$ represents the readjusted first color component, and $C2_{adj}$ represents the readjusted second color component, the sine value and cosine value are selected from the third look-up table.

4. The hue adjusting device of claim 1, wherein the display system comprises a hue dividing device coupled with the hue adjusting device, the hue dividing device stores a fourth look-up table, the fourth look-up table records a plurality of boundaries for dividing the hue angles into the color axes.

5. The hue adjusting device of claim 1, wherein the first memory unit is a non-volatile and rewritable storing device, the second memory unit is a random access memory (RAM) of an IC.

6. The hue adjusting device of claim 1, wherein the first color component and the second color component comply with one of the following color spaces: YCbCr, YUV, YIQ, HIS, HSV, and CIELab.

* * * * *